March 14, 1950     F. W. BROWNING     2,500,515
V-BELT SHEAVES
Filed Jan. 30, 1947

Inventor
FLETCHER W. BROWNING,
By Cyrus Kehr & Swecker
Attorneys

Patented Mar. 14, 1950

2,500,515

UNITED STATES PATENT OFFICE 2,500,515

V-BELT SHEAVE

Fletcher W. Browning, Knoxville, Tenn.

Application January 30, 1947, Serial No. 725,199

3 Claims. (Cl. 74—230.1)

This invention relates to improvements in V-belt sheaves of the character used, particularly in multiple V-belt drives.

It has been the practice heretofore to use multiple V-belts in driving units, in which a plurality of belts extends over a single sheave in V-grooves therein for driving a shaft. This has required a complete sheave having the desired number of V-grooves for each size and number of belts to be used. For different types of machinery, many different sizes and forms of sheaves are necessary, which is especially objectionable to a dealer, because of the large stock of parts that he is required to handle.

The object of this invention is to improve the construction of a V-belt drive by providing for the ready assembly of any desired number of V-belt rings on a single common spider adapted to be mounted on a shaft which will permit of variation of the number of belts to be used and the assembly of the parts desired for the drive very readily and quickly at relatively low cost. This would make it unnecessary for a dealer to handle many different sizes of sheaves because these can be assembled to the required specifications very readily and at lost cost while yet insuring of accurate operation.

A single spider is used and adapted to be mounted on a shaft and, preferably, has a single V-groove in the periphery thereof. Additional V-grooves may be built up by means of rings placed on either or both sides of the peripheral portion of the spider, each ring having a V-groove therein. Provision is made to insure the alignment of the rings and the attachment of these to the spider to produce a single unitary structure of the desired number of grooves.

The invention is illustrated in certain embodiments in the accompanying drawings, in which.

Figure 1:
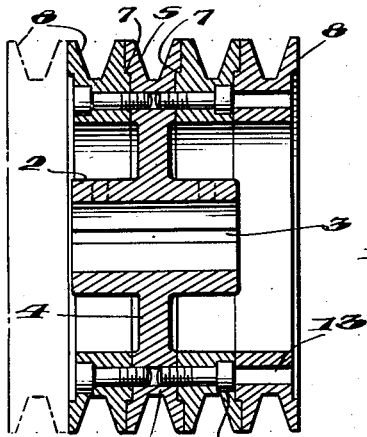
Fig. 1 is a vertical section through one form of sheave embodying this invention.

The invention is shown as including a spider, generally designated by the number 1, which forms the basic element of the sheave and the means adapted for connection with a shaft, either driving or driven. This spider 1 comprises a hub 2 for attachment to the shaft, by means of which the spider may be used for driving or to be driven. Any suitable means of attachment may be provided as desired, as a key seat 3 for the purpose. Extending outwardly from the hub 2, is a radial portion 4, such as spokes, joining the hub to a peripheral portion 5 of the spider. The portion 5 is shown as formed with a V-groove 6 in the periphery thereof, adapted to receive a V-belt.

Figure 6:
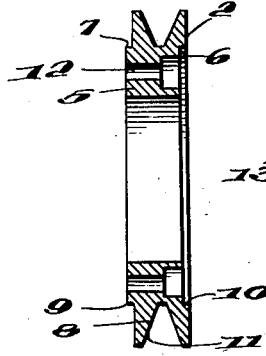
Fig. 6 is a sectional view through one of the rings detached.
Figure 7:
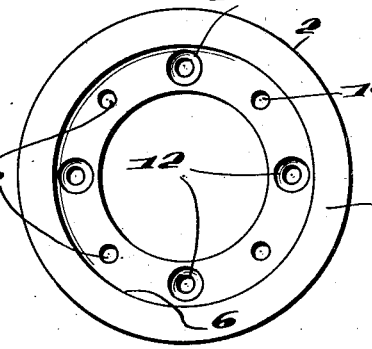
Fig. 7 is a face view thereof, in elevation.

The peripheral portion 5 of the spider 1 is shown as having recesses 7 in the opposite faces thereof, adapted to interfit with driving rings 8, any suitable number of which may be provided as desired. Each of the driving rings 8 is formed as an annulus, as shown in Figs. 6 and 7, with a projection 9 on one face thereof, and a corresponding recess 10 in the opposite face thereof. The projection 9 is adapted to enter the recess 7 of the spider 1, or the corresponding recess 6, of the next adjacent driving ring 8. This interengagement of the recesses and projections insures of accurate alignment of the parts of the sheave. The periphery of the driving ring 8 has a V-groove 11 therein.

Figure 2:
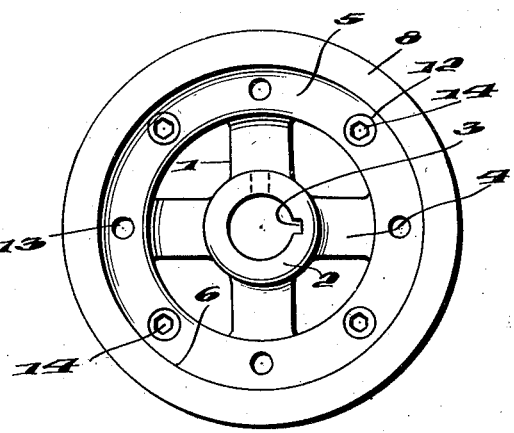
Fig. 2 is an end elevation thereof.

Each of the driving rings 8 has a plurality of openings therethrough, as indicated respectively at 12 and 13, which openings alternate from each other, as will be evident from Fig. 7. The openings 12 are countersunk and are adapted to receive therein headed screws 14, as shown in Figs. 1 and 2, while the openings 13 are internally threaded to receive the threaded ends of corresponding screws for securing the next adjacent driving ring thereto.

By means of these alternate countersunk and tapped holes 12 and 13, the screw fastenings are staggered with respect to each other and stepped around the periphery of the sheave. This insures that all of the rings and the spider will be tied together in secure relationship and in accurate alignment for uniform driving of the shaft.

By using these spiders and separate rings, they may be interconnected in any desired width of sheave and number of grooves, as desired. This will make it possible to add grooves to sheaves in use and to permit a dealer to assemble a large variety of sheaves from standard parts without the necessity for carrying in stock the respective different sizes thereof. This is a material saving to the dealer and manufacturer and will result in an appreciable saving to the user.

Figures 3, 4:
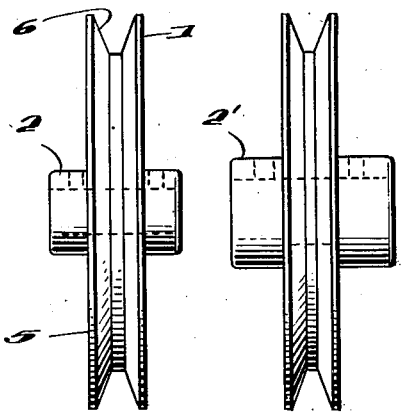
Fig. 3 is an edge view in elevation of the spider detached.
Fig. 4 is a similar view showing a slightly different form of spider.
Figure 5:
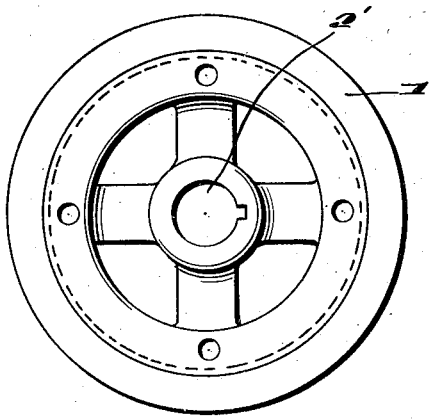
Fig. 5 is an end elevation of the spider shown in Fig. 4.

The size of driving rings may be so made as to fit spiders of different bore diameters, as indicated by the variation shown at 2, or in Figs. 4 and 5, or standard bushings may be used in a single spider, as desired, so as to adapt this to different sized shafts.

While the invention has been illustrated and described in certain embodiments, it is recognized that variations and changes may be made therein, without departing from the invention, except as specified in the claims.

I claim:

1. A V-belt sheave comprising a spider having a hub portion constructed for mounting on a shaft and having an annular peripheral portion symmetrically arranged relative to said hub portion and with a peripheral V-belt groove therein, a plurality of rings mounted on opposite sides of the peripheral portion of the spider coaxially thereof with one of said rings in abutting relation against each opposite side of the spider, each of said rings having a peripheral V-groove therein, said spider having a laterally countersunk face, each of the rings having a lateral projection at one face extending continuously throughout the circumference thereof corresponding in size and shape with the countersunk face of the spider and having the opposite face thereof countersunk for interfitting relation with adjacent rings, said spider having tapped holes in opposite sides thereof, each of the rings having countersunk bolt holes therein and tapped holes intermediate the bolt holes, headed screw fastenings extending through the bolt holes into threaded engagement with the spider at each opposite side thereof, and screw fastenings extending through each of the rings spaced from the spider and into threaded engagement with the next adjacent ring in the tapped holes thereof for securing the rings directly together.

2. A V-belt sheave comprising a spider having a hub portion constructed for mounting on a shaft and having an annular peripheral portion symmetrically arranged relative to said hub portion and with a peripheral V-belt groove therein, a plurality of rings mounted on opposite sides of the peripheral portion of the spider coaxially thereof with one of said rings in abutting relation against each opposite side of the spider, each of said rings having a peripheral V-groove therein, said spider having tapped holes in opposite sides thereof, each of the rings having countersunk bolt holes therein and tapped holes intermediate the bolt holes, headed screw fastenings extending through the bolt holes into threaded engagement with the spider at each opposite side thereof, and screw fastenings extending through each of the rings spaced from the spider and into threaded engagement with the next adjacent ring in the tapped holes thereof for securing the rings directly together.

3. A V-belt sheave comprising a spider having a portion constructed for mounting on a shaft and having an annular peripheral V-belt driving portion thereon, a ring mounted on one side of the peripheral portion of the spider coaxially thereof in abutting relation against a side of the spider, said ring having a V-belt driving portion thereon, said spider having tapped holes in a side thereof, the ring having countersunk bolt holes therein and tapped holes intermediate the bolt holes, headed screw fastenings extending through the bolt holes into threaded engagement with the spider with the heads flush with the outer surface of the ring adapted to receive a second ring in abutting relation thereon, and the tapped holes being arranged at said outer surface for receiving screw fastenings to hold said second ring in place thereon.

FLETCHER W. BROWNING.

REFERENCES CITED

The following references are of record in the file of this patent:

UNITED STATES PATENTS

| Number | Name | Date |
|---|---|---|
| 364,498 | Dougherty | June 7, 1887 |
| 464,795 | Dodge | Dec. 8, 1891 |
| 2,427,172 | Williams | Sept. 9, 1947 |